US012687952B2

(12) United States Patent
Hung et al.

(10) Patent No.: US 12,687,952 B2
(45) Date of Patent: Jul. 21, 2026

(54) ELECTRONIC DEVICE AND CONTROL METHOD THEREOF

(71) Applicant: COMPAL ELECTRONICS, INC., Taipei City (TW)

(72) Inventors: Hsiao-Ching Hung, Taipei City (TW); Yi-Chia Lee, Taipei City (TW); Yu-Wen Cheng, Taipei City (TW); Wang-Hung Yeh, Taipei City (TW); Hong-Tien Wang, Taipei City (TW)

(73) Assignee: COMPAL ELECTRONICS, INC., Taipei City (TW)

( * ) Notice: Subject to any disclaimer, the term of this patent is extended or adjusted under 35 U.S.C. 154(b) by 0 days.

(21) Appl. No.: 18/882,775

(22) Filed: Sep. 12, 2024

(65) Prior Publication Data

US 2025/0085815 A1      Mar. 13, 2025

Related U.S. Application Data

(60) Provisional application No. 63/538,284, filed on Sep. 13, 2023.

(51) Int. Cl.
G06F 3/042 (2006.01)
G06F 3/04842 (2022.01)
(Continued)

(52) U.S. Cl.
CPC ........ G06F 3/0425 (2013.01); G06F 3/04842 (2013.01); G06F 3/04883 (2013.01);
(Continued)

(58) Field of Classification Search
CPC ............... G06F 3/0425; G06F 3/04842; G06F 3/04883; G06F 3/04886; G06F 3/167; G06F 2203/04803; G06F 3/0488
See application file for complete search history.

(56) References Cited

U.S. PATENT DOCUMENTS 5,250,929 A * 10/1993 Hoffman ................. G06F 3/033
345/157
5,748,185 A * 5/1998 Stephan ................ G06F 3/0488
345/157

(Continued)

FOREIGN PATENT DOCUMENTS

TW          201020886          6/2010
TW          M490060          11/2014
(Continued)

OTHER PUBLICATIONS

"Office Action of Taiwan Counterpart Application", issued on Feb. 21, 2025, p. 1-p. 12.

*Primary Examiner* — Benyam Ketema
(74) *Attorney, Agent, or Firm* — JCIPRNET

(57) ABSTRACT

Disclosed is an electronic device including a display module, a touch light-emitting module, and a processing unit. The touch light-emitting module includes a light-transmitting unit, a touch unit, and a light-emitting unit. The touch unit is disposed under the light-transmitting unit and is adapted to generate a touch signal based on touch of the user on the light-transmitting unit. The light-emitting unit is disposed on the touch unit. The light-emitting unit is adapted to provide an illumination beam to the light-transmitting unit according to an illumination signal. The processing unit is electrically connected to the display module and the touch light-emitting module. When the electronic device is switched to a touch mode, the processing unit disables the light-emitting unit. When the electronic device is switched to a content input mode, the processing unit enables the light-emitting unit to provide the illumination beam to the light-transmitting unit.

32 Claims, 5 Drawing Sheets

(51) Int. Cl.
   *G06F 3/04883*     (2022.01)
   *G06F 3/04886*     (2022.01)
   *G06F 3/16*     (2006.01)
(52) U.S. Cl.
   CPC ......... *G06F 3/04886* (2013.01); *G06F 3/167*
      (2013.01); *G06F 2203/04803* (2013.01)

(56)                References Cited

U.S. PATENT DOCUMENTS

| | | | | |
|---|---|---|---|---|
| 6,538,880 B1 * | 3/2003 | Kamijo | ................ | G06F 1/1632 |
| | | | | 248/65 |
| 6,560,612 B1 * | 5/2003 | Yamada | ................ | G06F 1/1692 |
| | | | | 345/173 |
| 6,822,640 B2 * | 11/2004 | Derocher | ........... | G06F 3/03547 |
| | | | | 345/173 |
| 7,730,401 B2 * | 6/2010 | Gillespie | .............. | G06F 3/0481 |
| | | | | 715/767 |
| 8,172,444 B2 * | 5/2012 | Chan | ...................... | H01H 13/83 |
| | | | | 362/616 |
| 8,174,496 B2 * | 5/2012 | Sagong | .................. | H04M 1/67 |
| | | | | 345/169 |
| 8,232,810 B2 * | 7/2012 | Reynolds | ............. | G06F 3/0443 |
| | | | | 324/661 |
| 9,274,620 B2 * | 3/2016 | Cheng | ................ | G06F 3/03547 |
| 9,684,382 B2 * | 6/2017 | Shaw | ...................... | G06F 3/023 |
| 10,866,615 B1 * | 12/2020 | Ng | ........................ | G06F 1/1643 |
| 10,899,229 B2 * | 1/2021 | Rosicky | .............. | B60K 35/223 |
| 11,216,091 B2 * | 1/2022 | Ho | ...................... | G06F 3/04886 |
| 11,861,079 B1 * | 1/2024 | Yeh | ..................... | G02B 6/0068 |
| 11,983,399 B2 * | 5/2024 | Ogbevoen | ........... | G06F 3/03547 |
| 2004/0021681 A1 * | 2/2004 | Liao | .................... | G06F 3/04886 |
| | | | | 715/702 |
| 2006/0183505 A1 * | 8/2006 | Willrich | .............. | H04M 1/0214 |
| | | | | 455/566 |
| 2008/0246742 A1 * | 10/2008 | Wang | ................. | G06F 3/04883 |
| | | | | 345/184 |
| 2008/0266272 A1 * | 10/2008 | Narayan | ............. | G06F 3/03547 |
| | | | | 345/174 |

| | | | | |
|---|---|---|---|---|
| 2009/0111508 A1 * | 4/2009 | Yeh | ..................... | H04M 1/0256 |
| | | | | 455/575.8 |
| 2009/0160777 A1 * | 6/2009 | Liu | ......................... | H01H 13/86 |
| | | | | 345/169 |
| 2010/0137033 A1 * | 6/2010 | Lee | ...................... | G06F 1/1616 |
| | | | | 345/173 |
| 2010/0245260 A1 * | 9/2010 | Louch | ................... | G06F 3/0482 |
| | | | | 345/173 |
| 2010/0289503 A1 * | 11/2010 | Reynolds | ............. | H03K 17/955 |
| | | | | 361/57 |
| 2011/0164047 A1 * | 7/2011 | Pance | ...................... | G06F 3/01 |
| | | | | 361/679.01 |
| 2011/0267279 A1 * | 11/2011 | Alvarez Rivera | ..... | H10K 59/50 |
| | | | | 445/24 |
| 2012/0206249 A1 * | 8/2012 | Lee | ......................... | G09F 21/02 |
| | | | | 340/432 |
| 2015/0009128 A1 * | 1/2015 | Matsumoto | ........... | G06F 1/1637 |
| | | | | 345/76 |
| 2015/0109167 A1 * | 4/2015 | Yarga | ..................... | H01Q 5/371 |
| | | | | 343/700 MS |
| 2015/0227248 A1 * | 8/2015 | Yamazaki | .............. | G09G 3/035 |
| | | | | 361/679.01 |
| 2016/0103610 A1 * | 4/2016 | Huh | ......................... | G06F 3/14 |
| | | | | 345/168 |
| 2016/0370927 A1 * | 12/2016 | Fang | ..................... | G06F 1/1616 |
| 2019/0334282 A1 * | 10/2019 | Bai | ....................... | G06F 1/1654 |
| 2019/0369675 A1 * | 12/2019 | Chu | ..................... | G06F 1/1616 |
| 2020/0104042 A1 * | 4/2020 | Tsai | ..................... | G06F 1/1684 |
| 2020/0301524 A1 * | 9/2020 | Ho | ....................... | G06F 3/04886 |
| 2024/0411161 A1 * | 12/2024 | Hsieh | ..................... | G06F 3/013 |
| 2025/0085815 A1 * | 3/2025 | Hung | ..................... | G06F 3/167 |

FOREIGN PATENT DOCUMENTS

| | | |
|---|---|---|
| TW | 201804303 | 2/2018 |
| TW | 202036255 | 10/2020 |
| TW | I720885 | 3/2021 |
| TW | 202248820 | 12/2022 |

* cited by examiner

ELECTRONIC DEVICE AND CONTROL METHOD THEREOF

CROSS-REFERENCE TO RELATED APPLICATION

This application claims the priority benefits of U.S. provisional application Ser. No. 63/538,284, filed on Sep. 13, 2023. The entirety of the above-mentioned patent application is hereby incorporated by reference herein and made a part of this specification.

BACKGROUND

Technical Field

The disclosure relates to an electronic device, and in particular to an electronic device and a control method thereof.

Description of Related Art

Laptops are important tools for modern people in life and work. In order to improve the operating experience, laptops with lighting effects integrated into the keyboard, touchpad, or monitor have been proposed to give users a different visual experience. The uppermost surface of the touchpad of a conventional laptop is usually monochromatic and opaque, and such a conventional design can only accept the sliding input of the user to control the mouse cursor. Therefore, the functions thereof are relatively simple and lack interactive user experience.

At present, a new type of laptop design replaces the touchpad with a touch screen. Although the interactive user experience can be provided, the design greatly increases the overall cost, thereby reducing the desire to purchase among customers. Therefore, how to provide the interactive user experience without increasing costs is one of the development goals in this field.

SUMMARY

The disclosure provides an electronic device and a control method thereof, which can realize that when the electronic device is switched to different modes, the user can obtain the illumination visual effect of the corresponding mode through a touch light-emitting module.

The disclosure provides an electronic device, which includes a display module, a touch light-emitting module, and a processing unit. The touch light-emitting module includes a light-transmitting unit, a touch unit, and a light-emitting unit. The touch unit is disposed under the light-transmitting unit to generate a touch signal based on touch of a user on the light-transmitting unit. The light-emitting unit is disposed on the touch unit. The light-emitting unit is configured to provide an illumination beam to the light-transmitting unit according to an illumination signal. The processing unit is electrically connected to the display module and touch light-emitting module. In the operation, when the electronic device is switched to a touch mode, the processing unit disables the light-emitting unit. When the electronic device is switched to a content input mode, the processing unit enables the light-emitting unit to provide the illumination beam to the light-transmitting unit.

In an embodiment of the disclosure, the content input mode includes a writing mode and a speech mode, and the light-emitting unit is further configured to provide a first pattern beam and a second pattern beam to be imaged as a first pattern and a second pattern on the light-transmitting unit respectively. When the user clicks on the first pattern, the electronic device is switched to the writing mode. When the user clicks on the second pattern, the electronic device is switched to the speech mode.

In an embodiment of the disclosure, when the electronic device is switched to the writing mode, the processing unit controls the light-emitting unit to provide a writing mode beam. The writing mode beam includes a first writing mode beam and a second writing mode beam, and the first writing mode beam is different from the second writing mode beam. When the user clicks on the first pattern, the processing unit controls the light-emitting unit to provide the first writing mode beam. When the user writes on the light-transmitting unit, the processing unit controls the light-emitting unit to provide the second writing mode beam.

In an embodiment of the disclosure, when the user stops writing on the light-transmitting unit for more than a first predetermined time, the processing unit controls the light-emitting unit to stop providing the second writing mode beam, and switches the electronic device to the touch mode.

In an embodiment of the disclosure, the electronic device further includes a storage unit. When the electronic device is switched to the touch mode, the processing unit generates writing data in the storage unit according to the touch signal generated when the user writes on the light-transmitting unit.

In an embodiment of the disclosure, when the electronic device is switched to the writing mode, the processing unit executes an artificial intelligence software stored in the storage unit and generates a display signal to the display module, and when the storage unit obtains the writing data, the artificial intelligence software generates a result based on the writing data.

In an embodiment of the disclosure, when the light-emitting unit provides the first writing mode beam for more than the first predetermined time, the processing unit controls the light-emitting unit to stop providing the first writing mode beam, and switches the electronic device to the touch mode.

In an embodiment of the disclosure, when the electronic device is switched to the speech mode, the processing unit controls the light-emitting unit to provide a speech mode beam. The speech mode beam includes a first speech mode beam and a second speech mode beam, and the first speech mode beam is different from the second speech mode beam. When the user clicks on the second pattern and keeps pressing, the processing unit controls the light-emitting unit to provide the first speech mode beam. When the user clicks on the second pattern and a duration is less than a second predetermined time, the processing unit controls the light-emitting unit to provide the second speech mode beam.

In an embodiment of the disclosure, the first speech mode beam and the second speech mode beam are both dynamically changing lights.

In an embodiment of the disclosure, when the light-emitting unit provides the first speech mode beam and the user stops pressing the second pattern, the processing unit controls the light-emitting unit to stop providing the first speech mode beam, and switches the electronic device to the touch mode.

In an embodiment of the disclosure, the electronic device further includes a storage unit. When the electronic device stops providing the first speech mode beam and is switched to the touch mode, the processing unit generates speech data in the storage unit according to speech input from the user.

In an embodiment of the disclosure, when the electronic device is switched to the speech mode, the processing unit executes the artificial intelligence software stored in the storage unit according to the speech data and generates a display signal to the display module, and when the storage unit obtains the speech data, the artificial intelligence software generates a result based on the speech data.

In an embodiment of the disclosure, when the light-emitting unit provides the second speech mode beam and the user clicks on the second pattern, the processing unit controls the light-emitting unit to stop providing the second speech mode beam, and switches the electronic device to the touch mode.

In an embodiment of the disclosure, the electronic device further includes a storage unit. When the electronic device stops providing the second speech mode beam and switches to the touch mode, the processing unit generates the speech data in the storage unit according to speech input from the user.

In an embodiment of the disclosure, when the electronic device is switched to the speech mode, the processing unit executes the artificial intelligence software stored in the storage unit according to the speech data, and when the storage unit obtains the speech data, the artificial intelligence software generates a result based on the speech data.

In an embodiment of the disclosure, when the electronic device is switched to the content input mode, a graphical interface is displayed on a display surface of the display module according to the content input mode.

In an embodiment of the disclosure, the content input mode includes a writing mode, and the light-transmitting unit includes a first pattern corresponding to the writing mode. In the writing mode, the graphical interface on the display surface includes a first icon and a writing window corresponding to the first pattern, and writing content generated based on the touch of the user on the light-transmitting unit is mapped to the writing window.

In an embodiment of the disclosure, the content input mode includes a speech mode, and the light-transmitting unit includes a second pattern corresponding to the speech mode. In the speech mode, the graphical interface on the display surface includes a second icon and a speech window corresponding to the second pattern, and speech content provided by the user is mapped to the speech window.

The disclosure further provides a control method of an electronic device. The electronic device includes a display module, a touch light-emitting module, and a processing unit. The touch light-emitting module includes a light-transmitting unit, a touch unit, and a light-emitting unit. The control method includes: generating a touch signal based on touch of a user on the light-transmitting unit; generating an illumination signal according to the touch signal; generating an illumination beam to the light-transmitting unit according to the illumination signal; and performing one of steps as follows according to a mode of the electronic device: (1) switching the electronic device to a touch mode and disabling the light-emitting unit; and (2) switching the electronic device to a content input mode, and enabling the light-emitting unit to provide the illumination beam to the light-transmitting unit.

In an embodiment of the disclosure, the content input mode includes a writing mode and a speech mode. The control method further includes: controlling the light-emitting unit to provide a first pattern beam and a second pattern beam to be imaged as a first pattern and a second pattern respectively; switching to the writing mode based on the user clicking on the first pattern; and switching to the speech mode based on the user clicking on the second pattern.

In an embodiment of the disclosure, when switching to the writing mode, the light-emitting unit is controlled to provide a writing mode beam. The writing mode beam includes the first writing mode beam and the second writing mode beam, and the first writing mode beam is different from the second writing mode beam, in which the method of switching to the writing mode based on the user clicking on the first pattern further includes: when the user clicks on the first pattern, controlling the light-emitting unit to provide the first writing mode beam; and when the user writes on the light-transmitting unit, controlling the light-emitting unit to provide the second writing mode beam.

In an embodiment of the disclosure, the method of controlling the light-emitting unit to provide the second writing mode beam further includes: when the user stops writing on the light-transmitting unit for more than the first predetermined time, controlling the light-emitting unit to stop providing the second writing mode beam; and switching the electronic device to the touch mode.

In an embodiment of the disclosure, the electronic device further includes a storage unit, and the method of switching the electronic device to the touch mode further includes: generating a touch signal based on the user writing on the light-transmitting unit; and generating writing data in the storage unit according to the touch signal.

In an embodiment of the disclosure, the method of switching the electronic device to the writing mode further includes: executing an artificial intelligence software stored in the storage unit; and when the storage unit generates and obtains writing data, generating a result based on the writing data.

In an embodiment of the disclosure, the method of controlling the light-emitting unit to provide the second writing mode beam further includes: when the light-emitting unit provides the first writing mode beam for more than the first predetermined time, controlling the light-emitting unit to stop providing the first writing mode beam; and switching the electronic device to the touch mode.

In an embodiment of the disclosure, when switching to the speech mode, the light-emitting unit is controlled to provide a speech mode beam. The speech mode beam includes a first speech mode beam and a second speech mode beam, and the first speech mode beam is different from the second speech mode beam. The method of switching to the speech mode based on the user clicking on the second pattern further includes: when the user clicks on the second pattern and keeps pressing, controlling the light-emitting unit to provide the first speech mode beam; and when the user clicks on the second pattern and the duration is less than the second predetermined time, controlling the light-emitting unit to provide the second speech mode beam.

In an embodiment of the disclosure, the method of controlling the light-emitting unit to provide the first speech mode beam further includes: when the user stops pressing the second pattern, controlling the light-emitting unit to stop providing the first speech mode beam; and switching the electronic device to the touch mode.

In an embodiment of the disclosure, the electronic device further includes a storage unit, and the method of switching the electronic device to stop providing the first speech mode beam and switching to the touch mode further includes: generating speech data in the storage unit according to speech input from the user.

In an embodiment of the disclosure, the method of the electronic device stopping providing the first speech mode beam and switching to the touch mode further includes: executing the artificial intelligence software stored in the storage unit; and when the storage unit generates the speech data, generating a result based on the speech data.

In an embodiment of the disclosure, the method of controlling the light-emitting unit to provide the second speech mode beam further includes: when the light-emitting unit provides the second speech mode beam and the user clicks on the second pattern, controlling the light-emitting unit to stop providing the second speech mode beam; and switching the electronic device to the touch mode.

In an embodiment of the disclosure, the electronic device further includes a storage unit, and the method of switching the electronic device to stop providing the first speech mode beam and switching to the touch mode further includes: generating speech data in the storage unit according to speech input from the user.

In an embodiment of the disclosure, the method of switching the electronic device to the touch mode further includes: executing the artificial intelligence software stored in the storage unit; and when the storage unit generates the speech data, generating a result based on the speech data.

In an embodiment of the disclosure, when the electronic device is switched to the speech mode, the control method further includes: determining whether the display module displays an input-enabled interface; and controlling the display module to display warning information.

In an embodiment of the disclosure, the method of switching the electronic device to the content input mode further includes: displaying a graphical interface on a display surface of the display module according to the content input mode.

In an embodiment of the disclosure, the content input mode includes a writing mode, and in the writing mode, the method of displaying the graphical interface on the display surface of the display module according to the content input mode further includes: controlling the light-emitting unit to provide a first pattern beam to be imaged as a first pattern on the light-transmitting unit; displaying the graphical interface including a first icon and a writing window according to the first pattern; and mapping to the writing window according to writing content generated based on the touch of the user on the light-transmitting unit.

In an embodiment of the disclosure, the content input mode includes a speech mode, and in the speech mode, the method of displaying the graphical interface on the display surface of the display module according to the content input mode further includes: controlling the light-emitting unit to provide a second pattern beam to be imaged as a second pattern on the light-transmitting unit; and displaying the graphical interface including a second icon according to the second pattern.

Based on the above, in the electronic device and the control method thereof according to the disclosure, the electronic device includes the display module, the touch light-emitting module, and the processing unit, and the touch light-emitting module includes a light-transmitting unit, a touch unit, and a light-emitting unit. In the configuration, the touch unit is configured to generate the touch signal based on the touch of the user on the light-transmitting unit. The processing unit generates the illumination signal according to the touch signal and switches the electronic device to the touch mode or the content input mode to disable or enable the light-emitting unit. The light-emitting unit is configured to provide the illumination beam to the light-transmitting unit according to the illumination signal. In this way, when the electronic device is switched to different modes, the user can obtain the illumination visual effect of the corresponding mode through the touch light-emitting module.

In order to make the above-mentioned features and advantages of the disclosure more comprehensible, embodiments are given below and described in detail with reference to the accompanying drawings.

DESCRIPTION OF THE EMBODIMENTS

Figure 1:
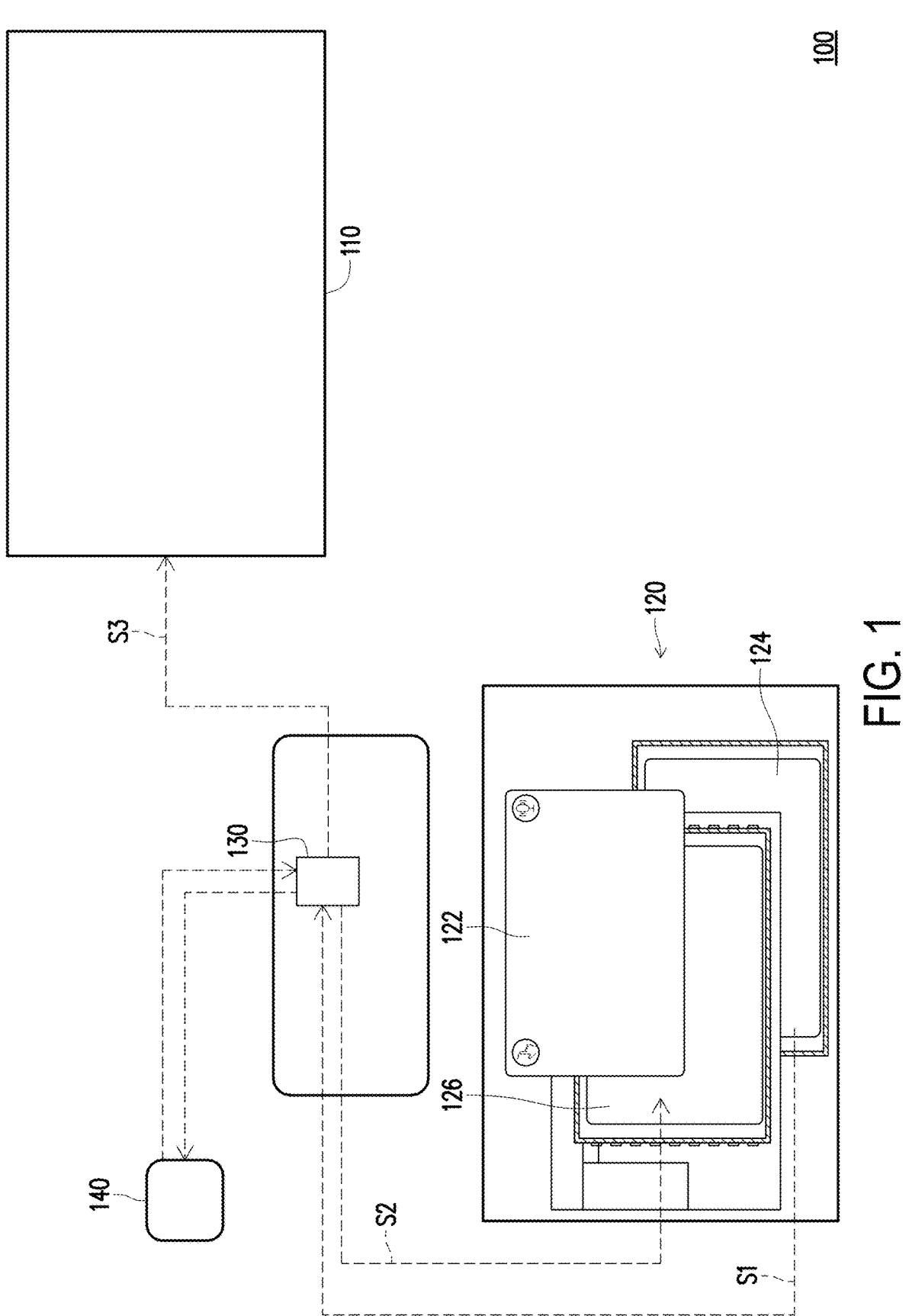
FIG. 1 is a schematic diagram of an electronic device according to an embodiment of the disclosure.

FIG. 1 is a schematic diagram of an electronic device according to an embodiment of the disclosure. Please refer to FIG. 1. This embodiment provides an electronic device 100, which includes a display module 110, a touch light-emitting module 120, and a processing unit 130. For example, in this embodiment, the electronic device 100 is, for example, a laptop or a tablet computer, including a first body and a second body that are pivoted, and the first body and the second body serve as a display end and an input interface end respectively, in which the display module 110 is installed in the first body, and the touch light-emitting module 120 and the processing unit 130 are installed in the second body.

The display module 110 is disposed in the first body of the electronic device 100 to display a display image. The display module 110 is, for example, a light-emitting diode display panel (LED display), an organic light-emitting diode display panel (OLED display), or other types of display panels, and the disclosure is not limited thereto.

The touch light-emitting module 120 is disposed on the second body of the electronic device 100 and is used as an interactive input interface at the input interface end. The touch light-emitting module 120 includes a light-transmitting unit 122, a touch unit 124, and a light-emitting unit 126. The light-transmitting unit 122, such as a light-transmitting plate or a light-transmitting casing, is exposed on the surface of the second body. The touch unit 124 is correspondingly disposed under the light-transmitting unit 122. The touch unit 124 is, for example, a circuit board including a touch circuit, and is configured to generate a touch signal S1 based on touch of the user on the light-transmitting unit 122. The light-emitting unit 126 is disposed on the touch unit 124 and is electrically connected to the touch unit 124. The light-emitting unit 126 is, for example, a combination of a light-emitting element and a light-guiding element, which is configured to provide different illumination beams according to different illumination signals S2 and penetrate the light-transmitting unit 122, so that users can obtain different illumination visual effects. The disclosure does not limit the type or light-emitting color of the light-emitting unit 126.

Figure 2:
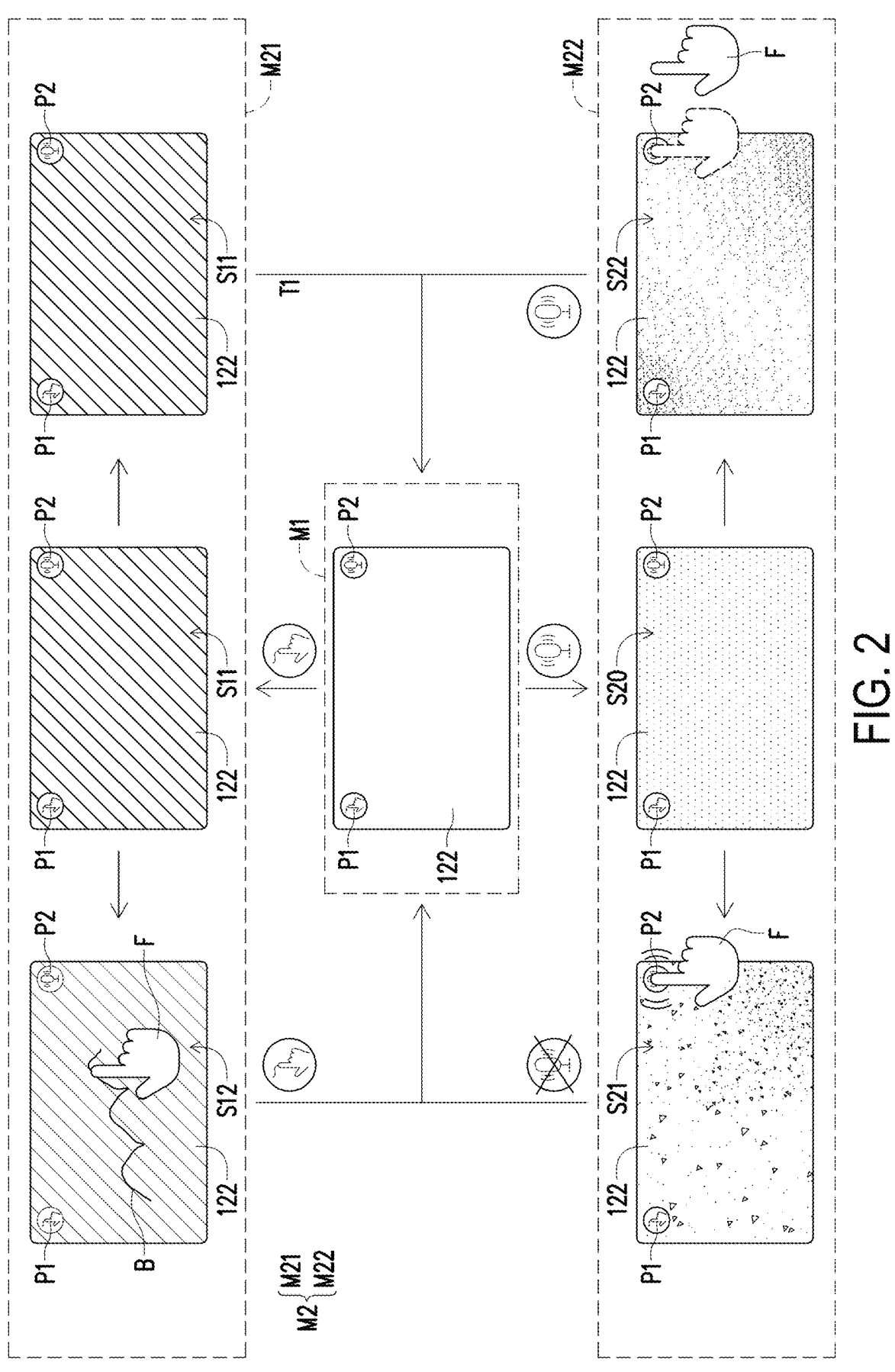
FIG. 2 is a schematic top view of a light-transmitting unit when the electronic device is switched to a content input mode according to an embodiment of the disclosure.

The processing unit 130 is electrically connected to the display module 110 and the touch light-emitting module 120, and is configured to generate the illumination signal S2 according to the touch signal S1 from the touch unit 124 and provide to the light-emitting unit 126. In addition, the processing unit 130 further generates a display signal S3 according to the touch signal S1 and provides to the display module 110 to display a corresponding display image. The processing unit 130 is, for example, a central processing unit (CPU), or other programmable general-purpose or special-purpose microprocessor, a digital signal processor (DSP), a programmable controller, an application specific integrated circuit (ASIC), or other similar components, or a combination of the above components, and the disclosure is not limited thereto. When the electronic device 100 is switched to a touch mode M1 (as shown in FIG. 2), for example, when controlling a mouse, the processing unit 130 disables the light-emitting unit 126 of the touch light-emitting module 120. When the electronic device 100 is switched to a content input mode M2 (as shown in FIG. 2), the processing unit 130 enables the light-emitting unit 126 of the touch light-emitting module 120 to provide an illumination beam to the light-transmitting unit 122. It should be noted that the content input mode M2 generally refers to input other than the mouse control. For example, writing input means that the touch unit 124 receives handwriting operations from the user and converts into text data or image data through appropriate recognition software, or speech input means that a microphone receives speech from the user. In this way, when the electronic device 100 is switched to different modes, the user can obtain the illumination visual effect of the corresponding mode through the touch light-emitting module 120, so as to understand that whether the mouse control or the content input is being performed at this moment. In this embodiment, the electronic device 100 further includes a wireless connection unit 140, such as a network card or a Bluetooth connection component, for wirelessly communicating information with an external electronic device.

FIG. 2 is a schematic top view of a light-transmitting unit when the electronic device is switched to a content input mode according to an embodiment of the disclosure. Please refer to FIG. 1 and FIG. 2. The light-transmitting unit 122 shown in this embodiment may at least be applied to the electronic device 100 shown in FIG. 1, and the configuration is taken as an example in the following description. In this embodiment, the content input mode M2 includes both a writing mode M21 and a speech mode M22, and the light-emitting unit 126 is further configured to provide a first pattern beam and a second pattern beam to be imaged as a first pattern P1 and a second pattern P2 on the light-transmitting unit 122 respectively. In this embodiment, the first pattern P1 is, for example, the writing pattern, and the second pattern P2 is, for example, the speech input pattern, but the disclosure is not limited thereto. When a user F clicks on the first pattern P1, the electronic device 100 is switched to the writing mode M21. When the user F clicks on the second pattern P2, the electronic device 100 is switched to the speech mode M22. In another embodiment, according to product specification requirements, the content input mode M2 may only have one function of the writing mode M21 or the speech mode M22 for the user to use.

Specifically, in this embodiment, when the electronic device 100 is switched to the writing mode M21, the processing unit 130 controls the light-emitting unit 126 to provide a writing mode beam. The writing mode beam includes a first writing mode beam and a second writing mode beam, and the first writing mode beam is different from the second writing mode beam. When the user F clicks on the first pattern P1, the processing unit 130 controls the light-emitting unit 126 to provide the first writing mode beam, then, a first writing mode display image S11 is displayed on the light-transmitting unit 122, and the color thereof may be designed as an RGB color model (255, 192, 0), for example. When the user F writes on the light-transmitting unit 122 (for example, inputting with a finger to generate a track B), the processing unit 130 controls the light-emitting unit 126 to provide the second writing mode beam, then, a second writing mode display image S12 is displayed on the light-transmitting unit 122, and the color thereof may be designed as an RGB color model (255, 223, 127), for example. In other words, in terms of visual effects, the lightness of the second writing mode display image S12 is approximately 50% of the lightness of the first writing mode display image S11. Therefore, when the user F writes, the color of the image displayed on the light-transmitting unit 122 becomes lighter, and when the user F stops writing, the color of the image displayed on the light-transmitting unit 122 changes back to the original setting luminosity. In this way, the display effect may be different when writing or not writing, thereby the visual effect during operation is increased and the interactivity with the user is improved.

In addition, in the writing mode M21, when the user F stops writing on the light-transmitting unit 122 for more than a first predetermined time T1 (that is, the light-emitting unit 126 provides the second writing mode beam for more than a certain time and the user F does not continue writing), the processing unit 130 controls the light-emitting unit 126 to stop providing the second writing mode beam, and switches the electronic device 100 to the touch mode M1. For example, the first predetermined time T1 may be designed to be 5 seconds, but the disclosure is not limited thereto. Alternatively, a non-writing command may be executed at will (for example, pressing any key on the keyboard) to directly switch the electronic device 100 to the touch mode M1, but the disclosure is not limited thereto. On the other hand, when the light-emitting unit 126 provides the first writing mode beam for more than the first predetermined time T1 (that is, when the user F does not write for a period of time), the processing unit 130 controls the light-emitting unit 126 to stop providing the first writing mode beam, and switches the electronic device 100 to the touch mode M1. Similarly, in the situation, another non-writing command (such as pressing any key on the keyboard) may be executed to directly switch the electronic device 100 to the touch mode M1, but the disclosure is not limited thereto. In this way, the user understands that the processing unit 130 has suspended the recognition function of the handwriting operation through the disappearance of the first writing mode beam or the second writing mode beam, thereby avoiding the trouble of manually switching back to the touch mode M1, and also avoiding unnecessary power consumption of the electronic device 100.

Figure 3:
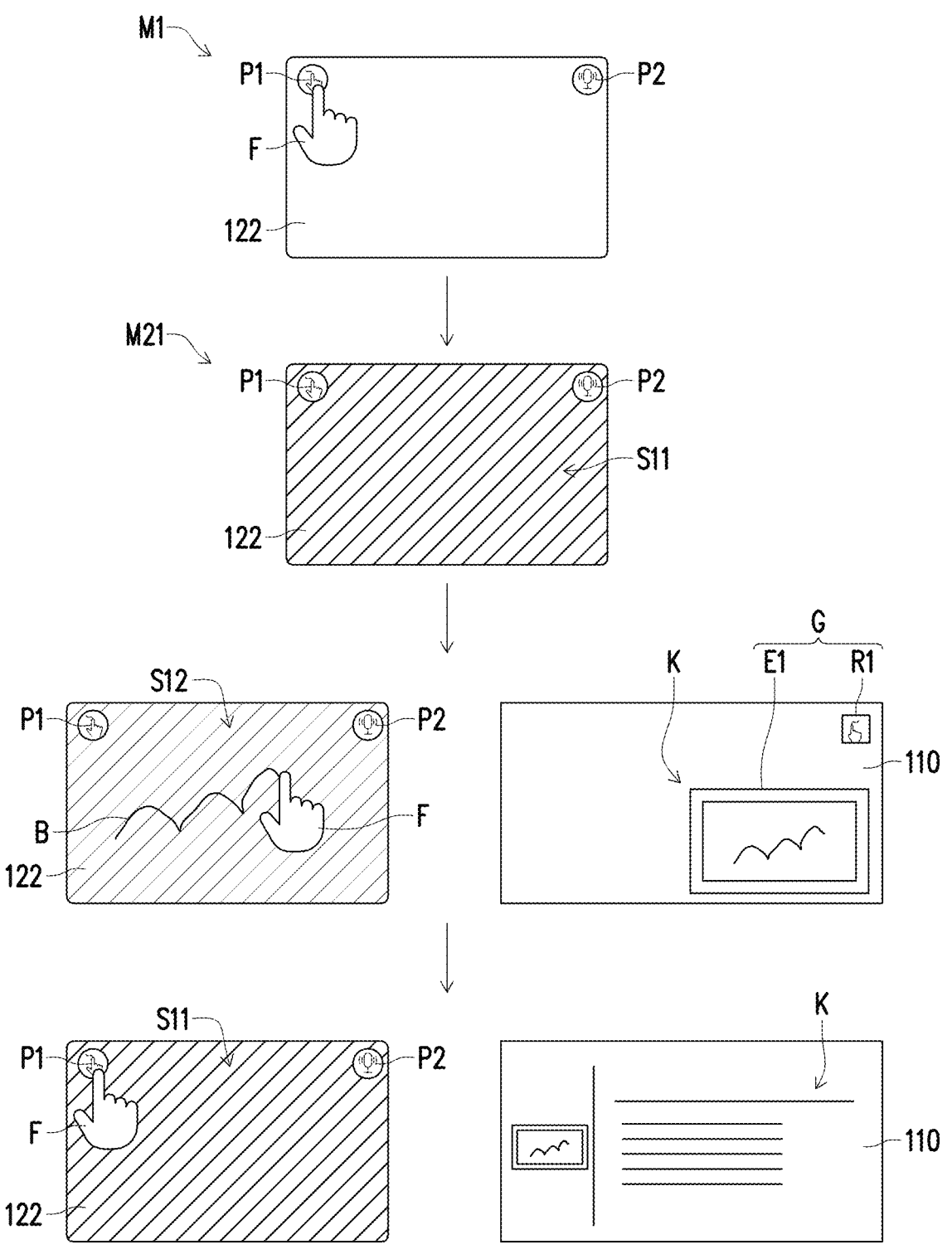
FIG. 3 is a schematic diagram comparing the light-transmitting unit and a display surface when the electronic device uses a writing mode according to an embodiment of the disclosure.

FIG. 3 is a schematic diagram comparing the light-transmitting unit and a display surface when the electronic device uses a writing mode according to an embodiment of the disclosure. Please refer to FIG. 2 and FIG. 3. The display module 110 and the light-transmitting unit 122 shown in this embodiment may at least be applied to the display module 110 and the light-transmitting unit 122 shown in FIG. 1 or FIG. 2, and the configuration is taken as an example in the following description. In this embodiment, when the content input mode M2 is executed, the electronic device may be automatically connected to an artificial intelligence software to generate input data. Specifically, the electronic device 100 may further include a storage unit. When the electronic device 100 stops providing the second writing mode beam (that is, stops writing) and switches back to the touch mode M1, the processing unit 130 generates writing data in the storage unit according to the touch signal S1 generated when the user F writes on the light-transmitting unit 122 (for example, inputting with a finger to generate the track B), and displays on the screen through the display module 110. Specifically, when the electronic device 100 is switched back to the writing mode M21, the processing unit 130 executes an artificial intelligence software K stored in the storage unit (local) or in the cloud and generates the display signal S3 to the display module 110, then, the real-time input information is displayed through the display module 110. Also, when the storage unit obtains the writing data, the artificial intelligence software K generates a result based on the writing data and may automatically store in a designated location, as shown in FIG. 3. The artificial intelligence software K is, for example, a generative AI application that may recognize whether the trajectory B is text or an image and then execute generated results such as Text to Image or Image to Image, but the type thereof is not limited in the disclosure.

Please continue to refer to FIG. 2. In this embodiment, when the electronic device 100 is switched to the speech mode M22, a speech receiving function of a microphone is automatically activated, and the processing unit 130 controls the light-emitting unit 126 to provide a speech mode beam. The speech mode beam includes a first speech mode beam and a second speech mode beam, and the first speech mode beam is different from the second speech mode beam. When the user F clicks on the second pattern P2 and keeps pressing (also referred to as long press), the processing unit 130 controls the light-emitting unit 126 to provide the first speech mode beam, for example, a dynamically changing light, then, the first speech mode display image S21 is displayed on the light-transmitting unit 122, as shown in FIG. 2. When the user F clicks on the second pattern P2 and the duration is less than a second predetermined time (for example, less than 2 seconds, also referred to as short press), the processing unit 130 controls the light-emitting unit 126 to provide the second speech mode beam, for example, another dynamically changing light different from the first speech mode beam, then, a second speech mode display image S22 is displayed on the light-transmitting unit 122, as shown in FIG. 2. The disclosure does not limit the color, brightness, change frequency, change mode, and other optical effects of the first speech mode display image S21 and the second speech mode display image S22. In addition, in this embodiment, the speech mode beam further includes a standby speech mode beam. When the user F does not click on the second pattern P2 yet to start speech input, the processing unit 130 controls the light-emitting unit 126 to provide the standby speech mode beam, then, a standby speech mode display image S20 is displayed on the light-transmitting unit 122, as shown in FIG. 2. In this way, differences in display effects can be achieved when using different speech modes, thereby the visual effect during operation is increased and the interactivity with the user is improved.

In addition, in the speech mode M22, when the light-emitting unit 126 provides the first speech mode beam and the user F stops pressing the second pattern P2 (that is, when the user F ends the long press), the processing unit 130 controls the light-emitting unit 126 to stop providing the first speech mode beam and to stop the speech receiving function of the microphone, and switches the electronic device 100 to the touch mode M1. On the other hand, when the light-emitting unit 126 provides the second speech mode beam and the user F clicks on the second pattern P2, the processing unit 130 controls the light-emitting unit 126 to stop providing the second speech mode beam and switches the electronic device 100 to the touch mode. M1. As mentioned above, the user understands that the processing unit 130 has suspended the speech input function through the disappearance of the illumination beam, thereby avoiding the trouble of manually turning off the microphone, and also avoiding unnecessary power consumption of the electronic device 100.

Figure 4:
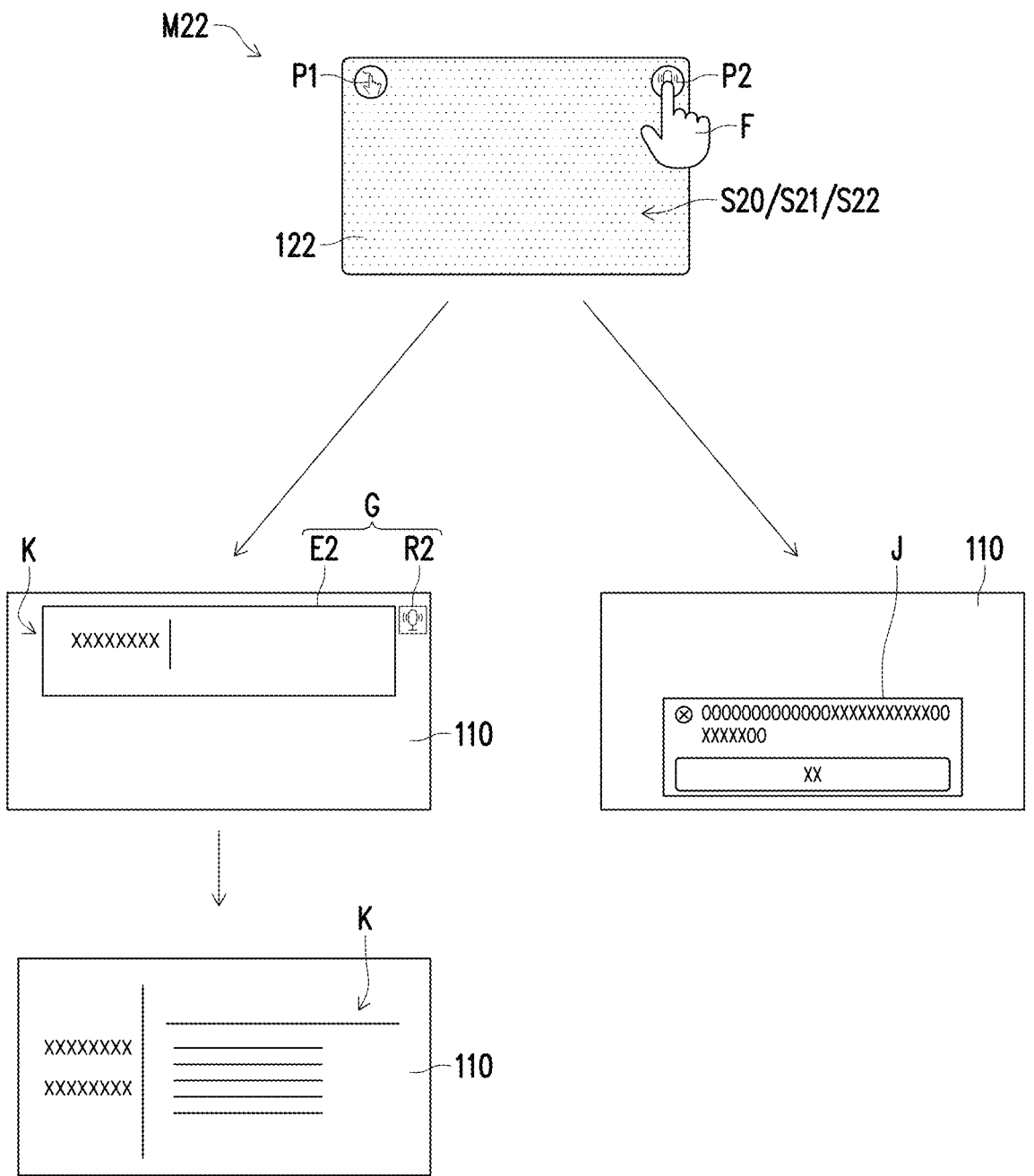
FIG. 4 is a schematic diagram comparing the light-transmitting unit and the display surface when the electronic device uses a speech mode according to an embodiment of the disclosure.

FIG. 4 is a schematic diagram comparing the light-transmitting unit and the display surface when the electronic device uses a speech mode according to an embodiment of the disclosure. Please refer to FIG. 2 and FIG. 4. The display module 110 and the light-transmitting unit 122 shown in this embodiment may at least be applied to the display module 110 and the light-transmitting unit 122 shown in FIG. 1 or FIG. 2, and the configuration is taken as an example in the following description.

In this embodiment, the electronic device 100 further includes a storage unit. When the electronic device 100 stops providing the first speech mode beam and switches back to the touch mode M1 (that is, when the long press ends), the processing unit 130 generates speech data in the storage unit according to the speech input from the user, and displays on the screen through the display module 110. Specifically, when the electronic device 100 is switched to the speech mode M22, the processing unit 130 executes the artificial intelligence software K stored in the storage unit (local) or in the cloud based on the speech data and generates a display signal to the display module 110, then, the real-time information is displayed through the display module 110. Also, when the storage unit obtains the speech data, the artificial intelligence software K generates a result based on the speech data and may automatically store in a designated location, as shown in FIG. 4. The artificial intelligence software K is, for example, a generative AI application that performs speech recognition (Speech to Text) on the obtained speech data and then executes generated results such as Text to Image or Text to Text. The artificial intelligence software K corresponding to the speech mode M22 may be the same as or different from the artificial intelligence software K corresponding to the writing mode M21, and the disclosure is not limited thereto. It is worth mentioning that when the artificial intelligence software K cannot be automatically executed for any reason, the processing unit 130 may further generate an error signal to the display module 110, and then display an interactive window J to prompt an error message through the display module 110, as shown in FIG. 4.

On the other hand, in the embodiment, when the electronic device 100 is switched to the content input mode M2, a graphical interface G is displayed on the display surface of the display module 110 according to the type of the content input mode M2. For example, when the content input mode M2 is the writing mode M21, the graphical interface G on the display surface of the display module 110 includes a first icon R1 and a writing window E1 corresponding to the first pattern P1, and the writing content generated based on the touch of the user on the light-transmitting unit 122 is mapped to the writing window E1. When the content input mode M2 is the speech mode M22, the graphical interface G on the display surface of the display module 110 includes the second icon R2 and the speech window E2 corresponding to the second pattern P2, and the speech content provided by the user is mapped to the speech window E2.

Figure 5:
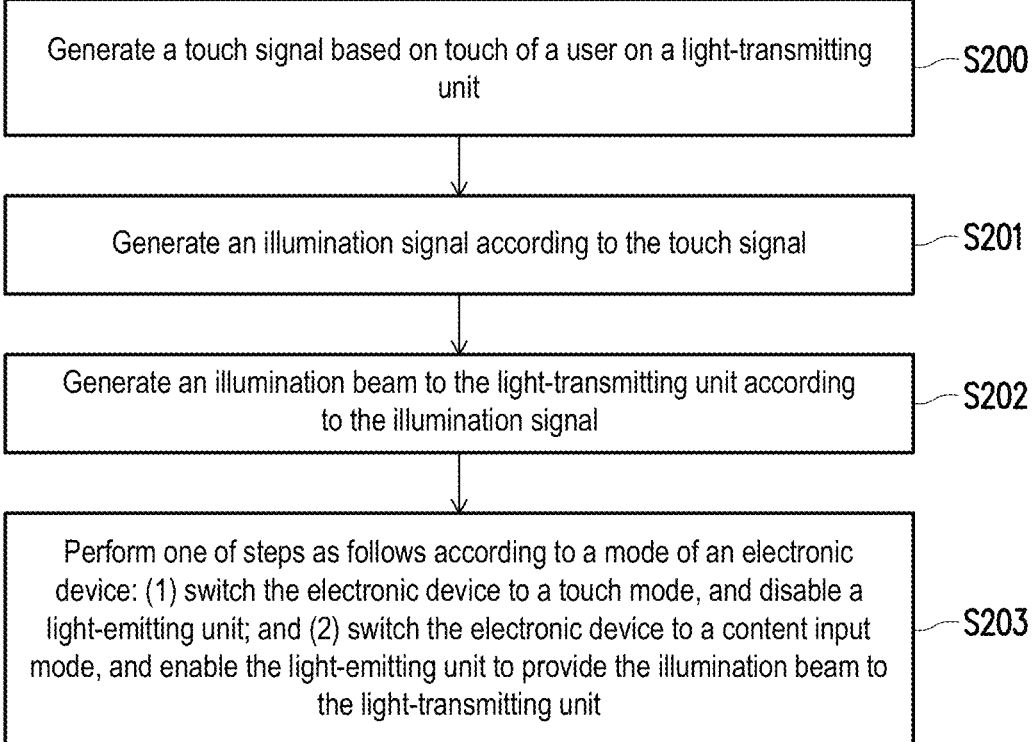
FIG. 5 is a step flow chart of a control method of the electronic device according to an embodiment of the disclosure.

FIG. 5 is a step flow chart of a control method of the electronic device according to an embodiment of the disclosure. Please refer to FIG. 1, FIG. 2, and FIG. 5. This embodiment provides a control method of the electronic device 100, which may at least be applied to the electronic device 100 and the components thereof shown in FIG. 1 and FIG. 2. In the configuration, the electronic device 100 includes the display module 110, the touch light-emitting module 120, and the processing unit 130, and the touch light-emitting module 120 includes the light-transmitting unit 122, the touch unit 124, and the light-emitting unit 126, and the configuration is taken as an example in the following description. In this embodiment, Step S200 is first executed. The touch signal S1 is generated based on the touch of the user F on the light-transmitting unit 122. Specifically, the touch signal S1 is generated by the user touching the light-transmitting unit 122 and is transmitted to the processing unit 130. Then, after the above step, Step S201 is executed. The illumination signal S2 is generated based on the touch signal S1. Specifically, the processing unit 130 generates the illumination signal S2 according to the touch signal S1 and transmits to the light-emitting unit 126 of the touch light-emitting module 120. Then, after the above step, Step S202 is executed. The illumination beam is generated to the light-transmitting unit 122 according to the illumination signal S2. Specifically, the light-emitting unit 126 generates the illumination beam according to the illumination signal S2 and transmits to the light-transmitting unit 122.

Then, after the above step, Step S203 is executed. One of steps as follows is executed according to the mode of the electronic device 100, that is, (1) the electronic device 100 is switched to the touch mode M1 and the light-emitting unit 126 is disabled, or (2) the electronic device 100 is switched to the content input mode M2 and the light-emitting unit 126 is enabled to provide the illumination beam to the light-transmitting unit 122. Specifically, in the embodiment, the control method further includes a step of controlling the light-emitting unit 126 to provide the first pattern beam and the second pattern beam to be imaged as the first pattern P1 and the second pattern P2 respectively. When the user F clicks on the first pattern P1, the electronic device 100 is switched to the writing mode M21, and when the user F clicks on the second pattern P2, the electronic device 100 is switched to the speech mode M22. In this way, when the electronic device 100 is switched to different modes, the user can obtain the illumination visual effect of the corresponding mode through the touch light-emitting module 120.

In the embodiment, in the writing mode M21, when the user F clicks on the first pattern P1, the light-emitting unit 126 is controlled to provide the first writing mode beam, and when the user F writes on the light-transmitting unit 122, the light-emitting unit 126 is controlled to provide the second writing mode beam. Further, when the light-emitting unit 126 provides the first writing mode beam for more than the first predetermined time T1, the light-emitting unit 126 is controlled to stop providing the first writing mode beam, and the electronic device 100 is switched to the touch mode M1. Alternatively, when the user F stops writing on the light-transmitting unit 122 for more than the first predetermined time T1, the light-emitting unit 126 is controlled to stop providing the second writing mode beam, and the electronic device 100 is switched to the touch mode M1. In addition, in the writing mode M21, the touch signal S1 is generated based on the user F writing on the light-transmitting unit 122, and the writing data is generated in the storage unit according to the touch signal S1. Optionally, the artificial intelligence software stored in the storage unit is executed and a result is generated based on the writing data.

In addition, in the speech mode M22, when the user F clicks on the second pattern P2 and keeps pressing, the light-emitting unit 126 is controlled to provide the first speech mode beam. Further, when the user stops pressing the second pattern P2, the light-emitting unit 126 is controlled to stop providing the first speech mode beam, and the electronic device 100 is switched to the touch mode M1. At the same time, the speech data may be generated in the storage unit according to the speech input from the user F. Optionally, the artificial intelligence software stored in the storage unit is executed and a result is generated based on the speech data. When the user F clicks on the second pattern P2 and the duration is less than the second predetermined time, the light-emitting unit 126 is controlled to provide the second speech mode beam. Further, when the light-emitting unit 126 provides the second speech mode beam and the user F clicks on the second pattern P2, the light-emitting unit 126 is controlled to stop providing the second speech mode beam, and the electronic device 100 is switched to the touch mode M1. At the same time, the speech data may be generated in the storage unit according to the speech input from the user F. Optionally, the artificial intelligence software stored in the storage unit is executed and a result is generated based on the speech data. In addition, in the speech mode M22, it may be further determined whether the display module 110 displays an input-enabled interface, and the display module 110 is controlled to display warning information. In this way, when the electronic device 100 is switched to different modes, the user can obtain the illumination visual effect of the corresponding mode through the touch light-emitting module 120.

In summary, in the electronic device and the control method thereof according to the disclosure, the electronic device includes the display module, the touch light-emitting module, and the processing unit, and the touch light-emitting module includes the light-transmitting unit, the touch unit, and the light-emitting unit. In the operation, the touch unit is configured to generate the touch signal based on the touch of the user on the light-transmitting unit. The processing unit generates the illumination signal according to the touch signal and switches the electronic device to the touch mode or the content input mode to disable or enable the light-emitting unit. The light-emitting unit is configured to provide the illumination beam to the light-transmitting unit according to the illumination signal. In this way, when the electronic device is switched to different modes, the user can obtain the illumination visual effect of the corresponding mode through the touch light-emitting module.

Although the disclosure has been disclosed above through embodiments, and the embodiments are not intended to limit the disclosure. Persons with ordinary knowledge in the relevant technical field may make some changes and modifications without departing from the spirit and scope of the disclosure. Therefore, the protection scope of the disclosure shall be determined by the appended claims.

What is claimed is:
1. An electronic device, comprising:
a display module;
a touch light-emitting module, comprising:
a light-transmitting unit;

a touch unit disposed under the light-transmitting unit to generate a touch signal based on touch of a user on the light-transmitting unit; and a light-emitting unit disposed on the touch unit, wherein the light-emitting unit is configured to provide an illumination beam to the light-transmitting unit according to the illumination signal; and a processing unit electrically connected to the display module and the touch light-emitting module, wherein in response to the electronic device being switched to a touch mode, the processing unit disables the light-emitting unit, and in response to the electronic device being switched to a content input mode, the processing unit enables the light-emitting unit to provide the illumination beam to the light-transmitting unit, wherein the content input mode comprises a writing mode and a speech mode, the light-emitting unit is further configured to provide a first pattern beam and a second pattern beam to be imaged as a first pattern and a second pattern on the light-transmitting unit respectively, in response to the user clicking on the first pattern, the electronic device is switched to the writing mode, and in response to the user clicking on the second pattern, the electronic device is switched to the speech mode, wherein in response to the electronic device being switched to the writing mode, the processing unit controls the light-emitting unit to provide a writing mode beam, the writing mode beam comprises a first writing mode beam and a second writing mode beam, the first writing mode beam is different from the second writing mode beam, in response to the user clicking on the first pattern, the processing unit controls the light-emitting unit to provide the first writing mode beam, and in response to the user writing on the light-transmitting unit, the processing unit controls the light-emitting unit to provide the second writing mode beam.

2. The electronic device as claimed in claim 1, wherein in response to the user stopping writing on the light-transmitting unit for more than a first predetermined time, the processing unit controls the light-emitting unit to stop providing the second writing mode beam, and switches the electronic device to the touch mode.

3. The electronic device as claimed in claim 2, further comprising a storage unit, wherein in response to the electronic device being switched to the touch mode, the processing unit generates writing data in the storage unit according to the touch signal generated based on the user writing on the light-transmitting unit.

4. The electronic device as claimed in claim 3, wherein in response to the electronic device being switched to the writing mode, the processing unit executes an artificial intelligence software stored in the storage unit and generates a display signal to the display module, and in response to the storage unit obtaining the writing data, the artificial intelligence software generates a result based on the writing data.

5. The electronic device as claimed in claim 1, wherein in response to the light-emitting unit providing the first writing mode beam for more than a first predetermined time, the processing unit controls the light-emitting unit to stop providing the first writing mode beam, and switches the electronic device to the touch mode.

6. The electronic device as claimed in claim 1, wherein in response to the electronic device being switched to the speech mode, the processing unit controls the light-emitting unit to provide a speech mode beam, the speech mode beam comprises a first speech mode beam and a second speech mode beam, the first speech mode beam is different from the second speech mode beam, in response to the user clicking on the second pattern and keeping pressing, the processing unit controls the light-emitting unit to provide the first speech mode beam, and in response to the user clicking on the second pattern and a duration is less than a second predetermined time, the processing unit controls the light-emitting unit to provide the second speech mode beam.

7. The electronic device as claimed in claim 6, wherein the first speech mode beam and the second speech mode beam are both dynamically changing lights.

8. The electronic device as claimed in claim 6, wherein in response to the light-emitting unit providing the first speech mode beam and the user stopping pressing the second pattern, the processing unit controls the light-emitting unit to stop providing the first speech mode beam, and switches the electronic device to the touch mode.

9. The electronic device as claimed in claim 8, further comprising a storage unit, wherein in response to the electronic device stopping providing the first speech mode beam and being switched to the touch mode, the processing unit generates speech data in the storage unit according to speech input from the user.

10. The electronic device as claimed in claim 9, wherein in response to the electronic device being switched to the speech mode, the processing unit executes an artificial intelligence software stored in the storage unit according to the speech data and generates a display signal to the display module, and in response to the storage unit obtaining the speech data, the artificial intelligence software generates a result based on the speech data.

11. The electronic device as claimed in claim 6, wherein in response to the light-emitting unit providing the second speech mode beam and the user clicking on the second pattern, the processing unit controls the light-emitting unit to stop providing the second speech mode beam, and switches the electronic device to the touch mode.

12. The electronic device as claimed in claim 11, further comprising a storage unit, wherein in response to the electronic device stopping providing the second speech mode beam and being switched to the touch mode, the processing unit generates speech data in the storage unit according to speech input from the user.

13. The electronic device as claimed in claim 12, wherein in response to the electronic device being switched to the speech mode, the processing unit executes an artificial intelligence software stored in the storage unit according to the speech data, and in response to the storage unit obtaining the speech data, the artificial intelligence software generates a result based on the speech data.

14. The electronic device as claimed in claim 1, wherein in response to the electronic device being switched to the content input mode, a graphical interface is displayed on a display surface of the display module according to the content input mode.

15. The electronic device as claimed in claim 14, wherein the content input mode comprises a writing mode, and the light-transmitting unit comprises a first pattern corresponding to the writing mode, in the writing mode, the graphical interface on the display surface comprises a first icon and a writing window corresponding to the first pattern, and writing content generated based on the touch of the user on the light-transmitting unit is mapped to the writing window.

16. The electronic device as claimed in claim 14, wherein the content input mode comprises a speech mode, and the light-transmitting unit comprises a second pattern corresponding to the speech mode, in the speech mode, the graphical interface on the display surface comprises a second icon and a speech window corresponding to the second pattern, and speech content provided by the user is mapped to the speech window.

17. A control method of an electronic device, wherein the electronic device comprises a display module, a touch light-emitting module, and a processing unit, the touch light-emitting module comprises a light-transmitting unit, a touch unit, and a light-emitting unit, and the control method comprises:

generating a touch signal based on touch of a user on the light-transmitting unit;

generating an illumination signal according to the touch signal;

generating an illumination beam to the light-transmitting unit according to the illumination signal; and performing one of the following according to a mode of the electronic device: (1) switching the electronic device to a touch mode and disabling the light-emitting unit; and (2) switching the electronic device to a content input mode, and enabling the light-emitting unit to provide illumination beam to the light-transmitting unit, wherein the content input mode comprises a writing mode and a speech mode, and the control method further comprises:

controlling the light-emitting unit to provide a first pattern beam and a second pattern beam to be imaged as a first pattern and a second pattern respectively;

switching to the writing mode based on the user clicking on the first pattern; and switching to the speech mode based on the user clicking on the second pattern, wherein in response to switching to the writing mode, the light-emitting unit is controlled to provide a writing mode beam, the writing mode beam comprises a first writing mode beam and a second writing mode beam, the first writing mode beam is different from the second writing mode beam, and the method of switching to the writing mode based on the user clicking on the first pattern further comprises:

controlling the light-emitting unit to provide the first writing mode beam in response to the user clicking on the first pattern; and controlling the light-emitting unit to provide the second writing mode beam in response to the user writing on the light-transmitting unit.

18. The control method of the electronic device as claimed in claim 17, wherein the method of controlling the light-emitting unit to provide the second writing mode beam further comprises:

controlling the light-emitting unit to stop providing the second writing mode beam in response to the user stopping writing on the light-transmitting unit for more than a first predetermined time; and switching the electronic device to the touch mode.

19. The control method of the electronic device as claimed in claim 18, wherein the electronic device further comprises a storage unit, and the method of switching the electronic device to the touch mode further comprises:

generating the touch signal based on the user writing on the light-transmitting unit; and generating writing data in the storage unit according to the touch signal.

20. The control method of the electronic device as claimed in claim 19, wherein the method of switching the electronic device to the writing mode further comprises:

executing an artificial intelligence software stored in the storage unit; and generating a result based on the writing data in response to the storage unit generating and obtaining the writing data.

21. The control method of the electronic device as claimed in claim 17, wherein the method of controlling the light-emitting unit to provide the second writing mode beam further comprises:

controlling the light-emitting unit to stop providing the first writing mode beam in response to the light-emitting unit providing the first writing mode beam for more than a first predetermined time; and switching the electronic device to the touch mode.

22. The control method of the electronic device as claimed in claim 17, wherein in response to switching to the speech mode, the light-emitting unit is controlled to provide a speech mode beam, the speech mode beam comprises a first speech mode beam and a second speech mode beam, the first speech mode beam is different from the second speech mode beam, and the method of switching to the speech mode based on the user clicking on the second pattern further comprises:

controlling the light-emitting unit to provide the first speech mode beam in response to the user clicking on the second pattern and keeping pressing; and controlling the light-emitting unit to provide the second speech mode beam in response to the user clicking on the second pattern and a duration is less than a second predetermined time.

23. The control method of the electronic device as claimed in claim 22, wherein the method of controlling the light-emitting unit to provide the first speech mode beam further comprises:

controlling the light-emitting unit to stop providing the first speech mode beam in response to the user stopping pressing the second pattern; and switching the electronic device to the touch mode.

24. The control method of the electronic device as claimed in claim 23, wherein the electronic device further comprises a storage unit, and the method of switching the electronic device to stop providing the first speech mode beam and switching to the touch mode further comprises:

generating speech data in the storage unit according to speech input from the user.

25. The control method of the electronic device as claimed in claim 24, wherein the method of the electronic device stopping providing the first speech mode beam and switching to the touch mode further comprises:

executing an artificial intelligence software stored in the storage unit; and generating a result based on the speech data in response to the storage unit generating the speech data.

26. The control method of the electronic device as claimed in claim 22, wherein the method of controlling the light-emitting unit to provide the second speech mode beam further comprises:

controlling the light-emitting unit to stop providing the second speech mode beam in response to the light-emitting unit providing the second speech mode beam and the user clicking on the second pattern; and switching the electronic device to the touch mode.

27. The control method of the electronic device as claimed in claim 26, wherein the electronic device further comprises a storage unit, and the method of switching the electronic device to stop providing the second speech mode beam and switching to the touch mode further comprises:

generating speech data is in the storage unit according to speech input from the user.

28. The control method of the electronic device as claimed in claim 27, wherein the method of switching the electronic device to the touch mode further comprises:

executing an artificial intelligence software stored in the storage unit; and generating a result based on the speech data in response to the storage unit generating the speech data.

29. The control method of the electronic device as claimed in claim 17, wherein in response to the electronic device switching to the speech mode, the control method further comprises:

determining whether the display module displays an input-enabled interface; and controlling the display module to display warning information.

30. The control method of the electronic device as claimed in claim 17, wherein the method of switching the electronic device to the content input mode further comprises:

displaying a graphical interface on a display surface of the display module according to the content input mode.

31. The control method of the electronic device as claimed in claim 30, wherein the content input mode comprises a writing mode, and in the writing mode, the method of displaying the graphical interface on the display surface of the display module according to the content input mode further comprises:

controlling the light-emitting unit to provide a first pattern beam to be imaged as a first pattern on the light-transmitting unit;

displaying the graphical interface comprising a first icon and a writing window according to the first pattern; and mapping to the writing window according to writing content generated based on the touch of the user on the light-transmitting unit.

32. The control method of the electronic device as claimed in claim 30, wherein the content input mode comprises a speech mode, and in the speech mode, the method of displaying the graphical interface on the display surface of the display module according to the content input mode further comprises:

controlling the light-emitting unit to provide a second pattern beam to be imaged as a second pattern on the light-transmitting unit; and displaying the graphical interface comprising a second icon according to the second pattern.

\* \* \* \* \*